Feb. 21, 1933.  N. E. LINDENBLAD  1,898,058
CORKSCREW RADIATION
Filed Aug. 17, 1927   2 Sheets-Sheet 1

INVENTOR
NILS. E. LINDENBLAD
BY Ira J. Adams
ATTORNEY

Feb. 21, 1933. N. E. LINDENBLAD 1,898,058
CORKSCREW RADIATION
Filed Aug. 17, 1927   2 Sheets-Sheet 2

INVENTOR
NILS E. LINDENBLAD
BY Ira J. Adams
ATTORNEY

Patented Feb. 21, 1933

1,898,058

UNITED STATES PATENT OFFICE

NILS E. LINDENBLAD, OF SHOREHAM, NEW YORK, ASSIGNOR TO RADIO CORPORATION OF AMERICA, A CORPORATION OF DELAWARE

CORKSCREW RADIATION

Application filed August 17, 1927. Serial No. 213,566.

This invention relates to corkscrew radiation, that is, to radiation accompanied by variation of the plane of polarization of the radiated energy.

The use of very high frequency energy for radio communication is exceedingly desirable because of the great distances spanned by relatively small amounts of energy. However, the commercial use of short waves for regular communication has been seriously handicapped by the prevalence of marked fading of signals. Various expedients have been proposed and applied in the effort to overcome fading, but none has proved entirely successful.

Experimental observation shows that high frequency waves often arrive in an altered plane of polarization, and that these variations occur in an unpredictable manner. I believe that the fading which occurs even after the adoption of expedients such as sharply directive transmission and frequency wobbling is due to the fact that waves of one plane of polarization may pass through a given atmospheric combination of refractive and reflective mediums, whereas another may not.

To overcome this I propose to transmit polarized wave trains which successively undulate in a plurality of directions transverse to the propagation axis. The transmission system includes a plurality of antennæ, preferably directive, positioned to radiate energy in different planes of polarization. It is desirable that only one of the antennæ operate at its maximum at one time, that is, the antennæ should be energized successively, so that in effect the plane of polarization is either varied or rotated, for if all of the antennæ were simultaneously supplied with energy probably no result would be obtained other than a resultant wave having a fixed polarization plane.

For successful propagation I consider it preferable that a complete train of high frequency waves be transmitted in each plane of polarization, for which it is essential that the frequency of variation of the plane of polarization be lower than the oscillation frequency, and to accomplish this is an object of my invention. This may be done by shifting the energy supply successively to the several antennæ employed in any suitable manner, such as by the use of commutator switches, or rotating capacitive or inductive coupling. The latter two may be preferable in order to obtain a sinusoidal variation of the amplitude of the wave trains in the individual antennæ, instead of an abrupt cut-off.

The manifest advantages of directive transmission are enhanced when it is desired to transmit a wave having a rotating plane of polarization, and it is a further object of my invention to overcome fading by combining the use of highly directive transmission with a rapid cyclic change in the plane of polarization of the transmitted energy. This combination of directivity with rotated polarization is applicable even where the frequency of rotation is equal to the frequency of oscillation, though I deem a lower rotative frequency to be far more desirable.

It is also desirable for the elimination of fading that the direction of propagation of the beam be slightly varied at a rapid rate so that the possibility of the emitted wave striking favorable refraction mediums be increased. This is especially important when using antennæ which are directive in elevation as well as in azimuth. To do this it is both feasible and simple to make the directivity of the several directive antennæ of different polarization planes slightly different.

For radiation of the truly corkscrew type several directive antennæ of different planes of polarization directed along a single propagation axis are required, and if wobbled directivity together with true corkscrew radiation is desired I make use of several complete corkscrew radiation systems, pointing in slightly different directions, and excited successively. In either case I both wobble the directivity and vary the plane of polarization of the emitted energy.

The more detailed specification which follows is accompanied by drawings in which Figure 1 shows one form of my invention employing a commutator distributor;

Figure 4:
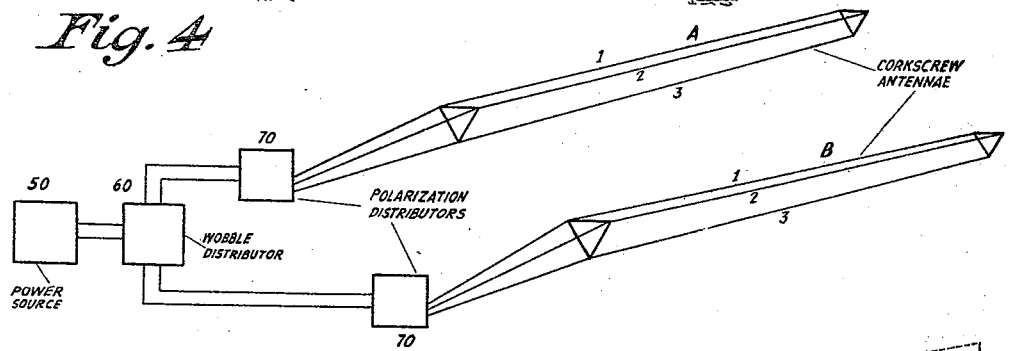
Figure 5:
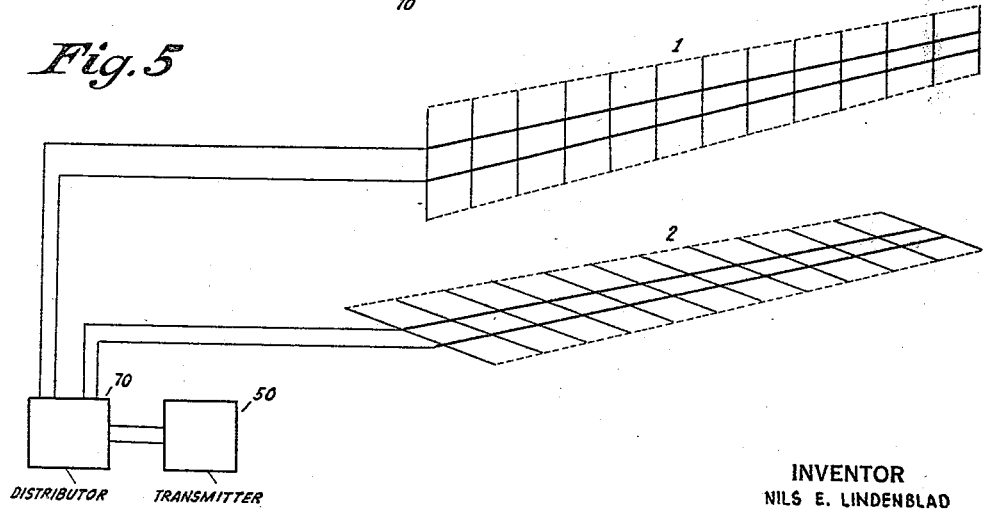

Figure 4 indicates a system combining directivity wobble with corkscrew radiation; and Figure 5 indicates a directive system in which the directive antennæ having different planes of polarization are themselves pointed in slightly different directions.

Figure 1:
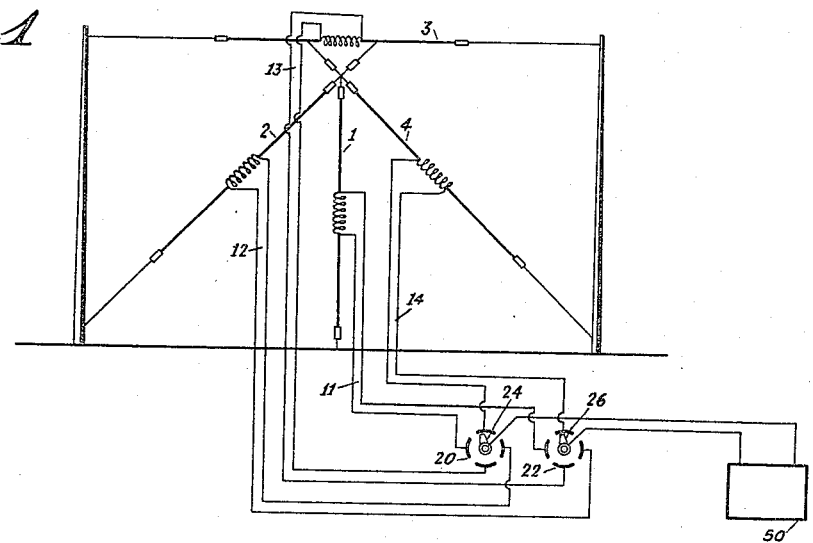

Referring to Figure 1 there are shown four doublets or half wave radiators 1, 2, 3, and 4, which are so positioned that their natural planes of polarization are 45° apart. These radiators are coupled by transmission lines 11, 12, 13, and 14 to each of two sets of contacts 20 and 22. The contact arms 24 and 26 are electrically separated, but may be mechanically mounted on a single shaft which is rotated at the speed at which the polarization plane is to be varied, which preferably should be super-audible but substantially lower than the oscillation frequency. High frequency power is supplied from the source 50 to the contact arms 24 and 26. During one rotation this system radiates successive wave trains which lie in different polarization planes.

Directivity may be obtained by substituting for each single radiator a plurality of radiators, and energizing these in proper phase relation to obtain the desired directivity. Thus, if a plurality of radiators are located in one plane and are excited in dephased relation about equal to the phase displacement occurring to a similar wave in ether the system will be directive along the line of location of the antennæ, whereas, if the same antennæ are all excited co-phasially the system will be directive at right angles to the line of location of the antennæ.

Figure 2:
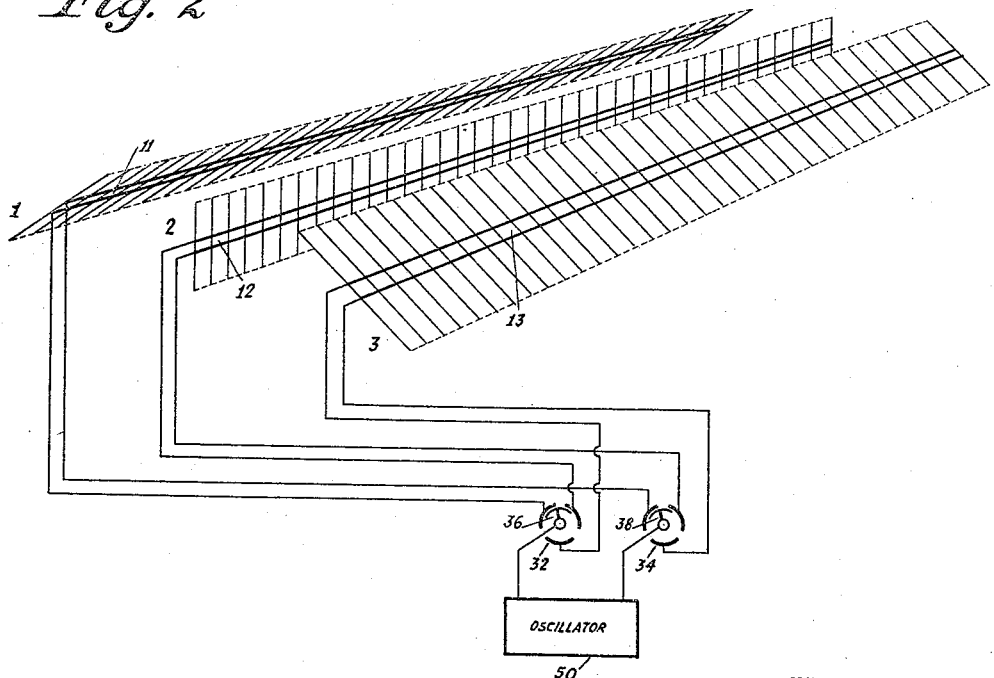
Figure 2 is a directive antenna system using a capacitance distributor.

In Figure 2 there has been symbolically indicated a system for corkscrew radiation utilizing three directive antennæ 1, 2, and 3, each composed of a plurality of radiators transversely coupled to transmission lines 11, 12, and 13. Such directive antennæ are described more in detail in a copending application of C. W. Hansell, Serial Number 161,771, filed Jan. 18, 1927, and my copending application, Serial Number 229,408 filed August 28, 1927, but in accordance with my invention three such antennæ are employed, and these are positioned to radiate energy in different natural planes of polarization and are energized in cyclic succession.

In this figure I have shown a capacitance distributor consisting of stationary condenser plates 32, and 34, with which simultaneously rotated movable condenser plates 36 and 38 cooperate. High frequency energy from a source 50 is coupled successively to the several antennæ when the movable condenser plates are rotated. This capacitance distributor, as well as a similar induction distributor, have the advantage that the energy distribution is not by complete cut-off, but rather by a variation which may, if desired, be made sinusoidal, with overlapping phase relation.

Figure 3:
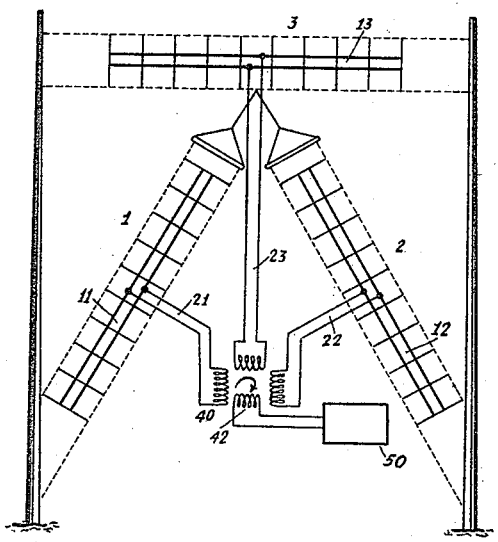
Figure 3 is another form of directive antenna system employing an induction distributor.

In Figure 3 there is indicated an antenna system consisting of directive antennæ 1, 2, and 3, for a more complete description of which the above mentioned applications are referred to. Each of these consists of a plurality of linear radiators connected transversely to feed lines 11, 12, 13, which are energized through transmission lines 21, 22, and 23, which in turn lead to the stationary coils of an induction distributor 40. The rotatable coil 42 is coupled to a source of high frequency energy 50, and is rotated by a suitable motor. The feed lines 11, 12, and 13 are adjusted for infinite velocity, so that the individual radiators for any one of the three antennæ are excited co-phasially, and the propagation axis of the wave is perpendicular to the plane of the antennæ.

In the arrangements described in Figures 2 and 3 the antennæ were directed towards the same objective. If it is thought expedient to use directivity in several directions then several such complete corkscrew transmitters may be employed. These preferably may be fed alternately, at a speed lower than the rotative speed of the plane of polarization. Such an arrangement is schematically indicated in Figure 4, in which A and B each symbolically represent complete antennæ systems for corkscrew radiation which are slightly differently directed. As before explained, each antenna system comprises a plurality of directive differently polarized antennæ. High frequency energy is obtained from a source 50, and this energy is distributed between the antennæ by a wobble distributor 60. The energy to each antenna system is distributed to the constituent polarized antennæ by the polarization distributors 70. I believe it preferable that the frequency of rotation be lower than the oscillation frequency, and that the frequency of wobble be lower than the frequency of rotation. More than two such antennæ may be used, and the wobble may be in elevation, azimuth, biased, or even conical.

It is also quite feasible to use several antennæ which differ in plane of polarization and in directivity, so that rotation of the plane of polarization and wobble of the directivity occur together. Such an arrangement is indicated in Figure 5, wherein the antennæ 1 and 2 are positioned with their planes of polarization perpendicular to one another, the antennæ pointing slightly differently but in the general direction of the receiving station. These antennæ may be energized from a high frequency source 50 through the medium of any suitable distributor 70.

In the claims which follow I do not intend the terms "successive" and "succession" to exclude the possibility of overlapping time duration, but rather to refer to the occurrence of the energization maxima.

I claim:

1. The method of propagating high frequency energy which includes rotating the plane of polarization of a directively emitted wave to obtain directive corkscrew radiation, and wobbling the directivity of the corkscrew radiation at a frequency lower than the rotative frequency.

2. A transmission system comprising a plurality of differently directed radiation systems each having a plurality of directive antennæ positioned to radiate energy in the same direction but in different natural planes of polarization, a source of high frequency power, means to energize the corkscrew radiation systems in cyclic succession for directivity wobble, and means to energize the polarized antennæ in cyclic succession for polarization variation.

NILS E. LINDENBLAD.